US008220383B2

(12) United States Patent
Rummel et al.

(10) Patent No.: US 8,220,383 B2
(45) Date of Patent: Jul. 17, 2012

(54) FOOD PRODUCT SLICER WITH TIMED SHARPENING OPERATION

(75) Inventors: Samuel A. Rummel, Pooler, GA (US); Shahram Shariff, Savannah, GA (US)

(73) Assignee: Premark FEG L.L.C., Wilmington, DE (US)

(*) Notice: Subject to any disclaimer, the term of this patent is extended or adjusted under 35 U.S.C. 154(b) by 510 days.

(21) Appl. No.: 12/422,498

(22) Filed: Apr. 13, 2009

(65) Prior Publication Data

US 2009/0255418 A1 Oct. 15, 2009

Related U.S. Application Data

(60) Provisional application No. 61/045,072, filed on Apr. 15, 2008.

(51) Int. Cl.
*B23D 33/02* (2006.01)
*B26D 7/12* (2006.01)

(52) U.S. Cl. ............... 99/537; 83/474; 83/174; 83/76.1; 451/420

(58) Field of Classification Search .................... 99/537; 83/474, 520, 76.1, 174; 451/48, 11, 45, 420; 76/85, 87, 89; 700/160, 174, 175
See application file for complete search history.

(56) References Cited

U.S. PATENT DOCUMENTS

| | | | | |
|---|---|---|---|---|
| 1,514,697 | A | | 11/1924 | Gury |
| 1,939,740 | A | | 12/1933 | Van Berkel |
| 2,141,055 | A | | 12/1938 | Van Berkel |
| 2,486,810 | A | | 11/1949 | Van Duyn |
| 2,698,638 | A | | 1/1955 | Foster |
| 2,970,624 | A | | 2/1961 | Lundell |
| 3,507,177 | A | * | 4/1970 | Baldwin ......................... 83/174 |
| 3,541,906 | A | * | 11/1970 | Sederberg et al. ................ 83/13 |
| 3,809,870 | A | | 5/1974 | Auble et al. |
| 3,986,304 | A | | 10/1976 | Shie, III |
| 4,019,286 | A | | 4/1977 | Spooner et al. |
| 4,090,403 | A | | 5/1978 | Tsukada et al. |
| 4,178,797 | A | | 12/1979 | Kozlowski, Jr. |
| 4,186,634 | A | | 2/1980 | Akczinski, Sr. |
| 4,201,101 | A | * | 5/1980 | Gerber .............................. 83/22 |
| 4,246,818 | A | | 1/1981 | McGraw, Jr. |
| 4,351,029 | A | | 9/1982 | Maxey et al. |
| 4,379,416 | A | * | 4/1983 | Kuchler ............................ 83/23 |
| 4,497,143 | A | | 2/1985 | Mattei |
| 4,685,364 | A | | 8/1987 | Scheflow et al. |
| 4,813,316 | A | | 3/1989 | Johnson et al. |

(Continued)

FOREIGN PATENT DOCUMENTS

DE 20309394 11/2003

(Continued)

OTHER PUBLICATIONS

PCT, International Search Report and Written Opinion, International Application No. PCT/US2009/040298 (9 pages) (Aug. 11, 2009).

(Continued)

*Primary Examiner* — Steven Wong
(74) *Attorney, Agent, or Firm* — Thompson Hine LLP

(57) ABSTRACT

A food product slicer with a rotatable slicer knife includes a knife sharpener and a control for providing a timed sharpening operation. The control effects rotation of the slicer knife for a set knife sharpen time period when a knife sharpen input of the slicer is triggered.

18 Claims, 4 Drawing Sheets

U.S. PATENT DOCUMENTS

| | | | | | |
|---|---|---|---|---|---|
| 4,817,480 | A | | 4/1989 | Young | |
| 4,834,303 | A | * | 5/1989 | McClure et al. | 241/101.2 |
| 4,962,581 | A | | 10/1990 | Rutigliano | |
| 5,098,027 | A | | 3/1992 | McClure et al. | |
| 5,101,704 | A | * | 4/1992 | Jones et al. | 83/174 |
| 5,144,773 | A | | 9/1992 | Flores et al. | |
| 5,152,105 | A | * | 10/1992 | Belvederi | 451/8 |
| 5,188,011 | A | | 2/1993 | Somal et al. | |
| 5,209,025 | A | | 5/1993 | Martin et al. | |
| 5,303,515 | A | * | 4/1994 | Etcheparre et al. | 451/45 |
| 5,379,633 | A | | 1/1995 | Flisram et al. | |
| 5,509,337 | A | | 4/1996 | Norman et al. | |
| 5,591,072 | A | * | 1/1997 | Tweed et al. | 451/293 |
| 5,609,512 | A | | 3/1997 | Holmes et al. | |
| 5,626,065 | A | | 5/1997 | Cattini | |
| 5,666,866 | A | * | 9/1997 | Huang et al. | 83/77 |
| 5,860,343 | A | | 1/1999 | Koch et al. | |
| 6,123,449 | A | | 9/2000 | Sadek-Patt | |
| 6,397,741 | B1 | | 6/2002 | Curtin | |
| 6,475,063 | B2 | * | 11/2002 | Wolf | 451/5 |
| 6,591,157 | B1 | | 7/2003 | Vivirito et al. | |
| 6,709,319 | B2 | * | 3/2004 | Yan | 451/70 |
| 6,871,573 | B2 | | 3/2005 | Mang | |
| 7,083,503 | B2 | * | 8/2006 | Sommer | 451/45 |
| 7,134,937 | B1 | * | 11/2006 | Chen et al. | 451/11 |
| 2001/0018317 | A1 | | 8/2001 | Yan | |
| 2006/0074513 | A1 | * | 4/2006 | DeRose et al. | 700/175 |
| 2007/0142959 | A1 | * | 6/2007 | Rummel et al. | 700/160 |

FOREIGN PATENT DOCUMENTS

| | | |
|---|---|---|
| EP | 0574649 | 12/1993 |
| EP | 1136201 | 9/2001 |
| WO | 00/66333 | 11/2000 |

OTHER PUBLICATIONS

PCT, International Preliminary Report on Patentability, International Application No. PCT/US2009/040298 (Oct. 28, 2010).

* cited by examiner

FOOD PRODUCT SLICER WITH TIMED SHARPENING OPERATION

CROSS-REFERENCE

This application claims the benefit of U.S. Provisional Application Ser. No. 61/045,072, filed Apr. 15, 2008, the entirety of which is hereby incorporated by reference.

TECHNICAL FIELD

This application relates generally to food product slicers used for slicing bulk food products and, more specifically, to a food product slicer including a timed slicer knife sharpening operation.

BACKGROUND

Food product slicers having circular slicer knives are commonly used in restaurant and grocery businesses, among others. The use of slicer mounted knife sharpening assemblies to sharpen the peripheral edge of the slicer knife when necessary is also known. Many operators have difficulty determining when the slicer knife needs to be sharpened. The nature and extent of use of the slicer can vary widely, making the determination even more difficult. It would be desirable to provide a food product slicer that incorporates a feature that automatically identifies when the slicer knife should be sharpened.

SUMMARY

In one aspect, a slicer for use in slicing a food product includes a slicer body, a slicer knife mounted for rotation relative to the slicer body, the slicer knife having a peripheral cutting edge, and an associated knife drive motor. A food product carriage is mounted to the slicer body for reciprocating movement back and forth past a cutting zone of the slicer knife. A controller is operable to initiate a sharpen knife annunciator based upon at least one operating parameter of the slicer, the controller associated with the knife drive motor to effect operation thereof. A knife sharpen input device is associated with the controller, upon actuation of the knife sharpen input device the controller causes the knife drive motor to be energized for a set knife sharpening time period.

In another aspect, a slicer for use in slicing a food product includes a slicer body, a slicer knife mounted for rotation relative to the slicer body, the slicer knife having a peripheral cutting edge, and an associated knife drive motor. A food product carriage is mounted to the slicer body for reciprocating movement back and forth past a cutting zone of the slicer knife. A knife sharpen input device, knife sharpen light element and sensor for detecting movement of the food product carriage are provided. A controller is associated with the knife drive motor, the knife sharpen input device, the knife sharpen light element and the sensor. The controller is programmed to (i) monitor the sensor to maintain a count of food product carriage slicing strokes, (ii) effect illumination of the knife sharpen light element when the count reaches a set threshold, (iii) upon actuation of the knife sharpen input device, effect operation of the knife drive motor for a set time period, after which operation of the knife drive motor is automatically stopped.

In a further aspect, A method of knife sharpening in connection with a food product slicer having a rotatable slicer knife involves: (a) illuminating a time-to-sharpen button on determining that the slicer knife should be sharpened; (b) subsequent to step (a), actuating the time-to-sharpen button to initiate a delayed operation of a slicer knife motor to effect rotation the slicer knife; (c) subsequent to step (b), moving a sharpener into contact with a cutting edge of the rotating slicer knife; (d) subsequent to step (c), automatically stopping the knife motor after a set time period has passed; and (e) subsequent to step (d), flashing the time-to-sharpen button to identify successful completion of the sharpening operation.

The details of one or more embodiments are set forth in the accompanying drawings and the description below. Other features, objects, and advantages will be apparent from the description and drawings, and from the claims.

DETAILED DESCRIPTION

Figure 1:
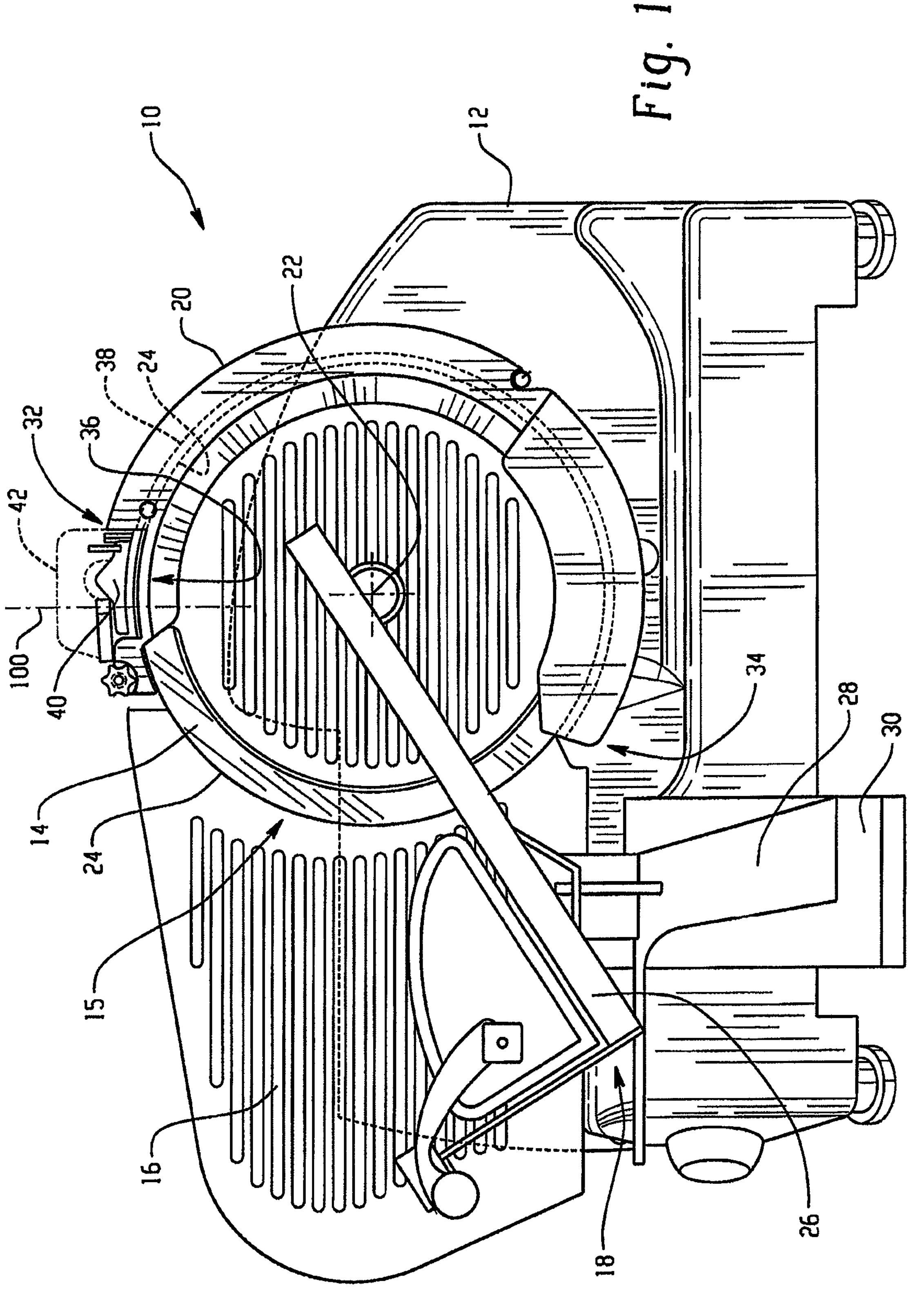
FIG. 1 is a side elevation of a food product slicer.

Referring to FIG. 1, a food slicing machine 10 includes housing 12 that, with other components such as an internal casting form part of the slicer body (often times also referred to as a base). Slicing machine 10 also includes a circular slicing knife 14, gauge plate 16, product supporting carriage 18 and a cover plate 20. The circular slicing knife 14 is mounted to the slicer body for rotation about an axis 22 by a motor or other drive (not shown). A peripheral cutting edge 24 of the knife is exposed in a cutting region 15 of the knife that is proximate the gauge plate 16 (e.g., generally extending from approximately a seven o'clock position to an eleven o'clock position in the illustrated embodiment, with other variations possible). The gauge plate is movable transversely with respect to a plane defined by the peripheral edge 24 of the knife to control slice thickness, and can be located in a "zero" position wherein it is slightly raised above the cutting zone of the peripheral edge 24. The food product carriage 18 includes tray 26 mounted on support arm 28, which in turn may be pivotally mounted to a transport 30 that extends into the housing. The transport 30 is supported internal of the housing for linear, reciprocating movement back and forth past the slicer knife 14 in any suitable manner, variations of which are known in the art. Carriage movement may be implemented manually or automatically (e.g., as by a drive motor and belt system, by hydraulics or by other means). As food product is moved past the cutting edge of the knife in a slicing stroke, the food product on the tray 26 slides across the outwardly facing surface of the cover plate 20, which surface may be formed with raised ridges to improve slidability.

The illustrated cover plate 20 covers the peripheral cutting edge 24 of the slicer knife 14 from about a one o'clock position 32 to about a seven o'clock position 34. The peripheral cutting edge 24 is shown in shadow beneath the cover plate 20. In a twelve o'clock region 36 of the slicer knife 14, the cover plate diameter decreases to provide a space or opening at which the edge of knife can be sharpened. The cover plate 20 also extends over a ring guard 38 (only inner edge shown in shadow in FIG. 1) that is disposed about the peripheral cutting edge along at least a portion of the non-cutting zone of the circular slice knife, leaving a gap between ring guard and the peripheral cutting edge as shown. The ring guard may be fixed to the housing 12 in a stationary manner, or may be fixed to the housing to permit some movement for cleaning as described in U.S. Pat. No. 5,509,337. In either case, the ring guard is positioned to protect the cutting edge 24 of the slicing knife 14. In the illustrated embodiment, the ring guard 38 does not extend into the twelve o'clock zone 36 of the slicer knife, but such zone is provided with a knife guard member 40 that moves to permit sharpening by a sharpener assembly 42 (shown only in outline in FIG. 1). For example, knife guard member 40 may pivot about an axis 100 during sharpening. A small gap is provided between the knife guard member 40 and the peripheral edge 24 of the knife as shown.

Figure 2:
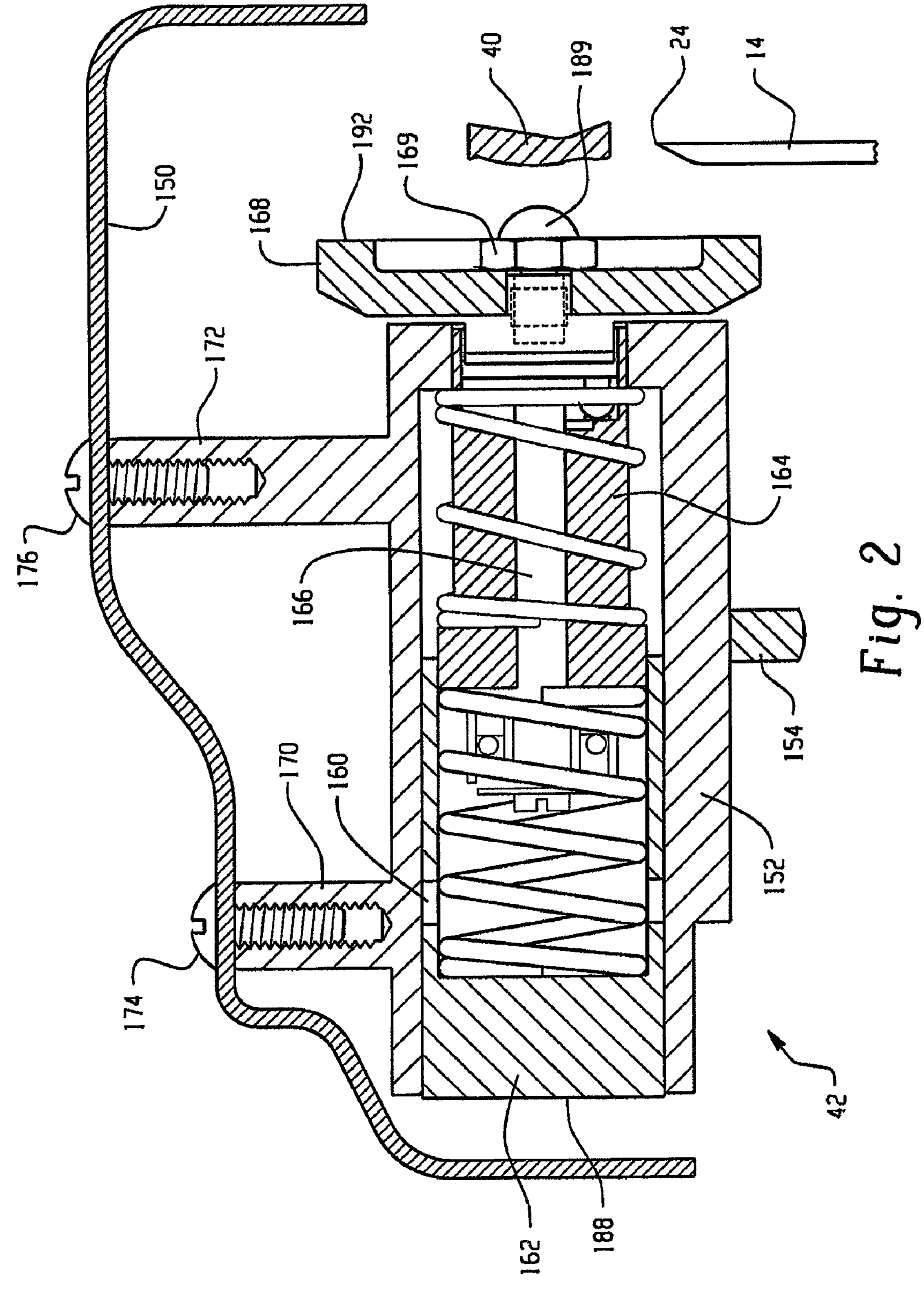
FIG. 2 is a partial cross-section of a manual knife sharpener assembly.

The configuration of the sharpening assembly 42 provided in connection with a given slicer can vary widely. Referring now to FIG. 2, a sharpener assembly similar to that described in U.S. Pat. No. 5,591,072 is shown. A cover 150 is coupled to a stationary block member 152. A mounting post 154 extends from the bottom of block member 152 and may include outwardly projecting pins (not shown) for positioning in the side slots of a mount opening (not shown) that may be formed in a mount arm (not shown) of the slicer body. The block member 152 includes a through passage or cavity 160 extending from end to end thereof and in which an actuator body 162 is slidably positioned for engaging a plunger assembly 164. The actuator body and plunger assembly operate substantially as described in U.S. Pat. No. 5,591,072 such that when actuator body 162 is moved toward the knife (e.g., to the right in FIG. 2), the springs of the plunger assembly 164 are compressed and the shaft 166 is moved toward the knife 14 so as to move the sharpening stone, in the form of wheel 168, toward the knife 14 into a sharpening position in contact with the edge 24 of the knife 14. A stone retaining screw or bolt 169 is provided to hold the sharpening wheel 168 in place while at the same time allowing it to rotate. Alternatively, a screw may extend outward from within the block member 152 and member 169 may be a nut threaded onto the screw. As shown, the top of block member 152 includes mount posts 170, 172 for receiving fasteners 174, 176 to mount the cover 150 to the block member 152.

In one embodiment, an actuating handle or lever (not shown) may be provided for contacting the rear side 188 of the block member 152 to push the block member toward the knife 14 and move the sharpening wheel 168 from its standby position, which is the position shown in FIG. 2, to a sharpening position. As seen, when the stone 168 is moved toward the knife 14, the head 189 of the bolt 169 will contact the side of the knife guard member 40 prior to the working surface 192 of the stone 168 contacting the knife 14, which will pivot the knife guard member out of the cutting edge guarding position and into the cutting edge sharpening position. The sharpening assembly may also include a truing stone (not shown) that pivots to the right side of the knife 14 (as viewed in FIG. 2) when the actuator body 162 is moved to the right to its fullest extent, as is generally shown and described in U.S. Pat. No. 5,591,072. An interlock (not shown) may be provided in connection with the knife guard member 40 to hold the knife guard member in its cutting edge guarding position, in which the sharpener assembly 42 may include an interlock actuator (not shown) for automatically disabling the interlock during a sharpening operation, to permit the knife guard member to move to its cutting edge sharpening position. A solenoid or other powered actuator (e.g., motor drive, pneumatic actuator or linear actuator) may also be provided for moving the knife guard member 40. Alternatively, as shown in U.S. Pat. No. 4,817,480, the sharpener may be associated with the carriage when needed for sharpening.

Figure 3:
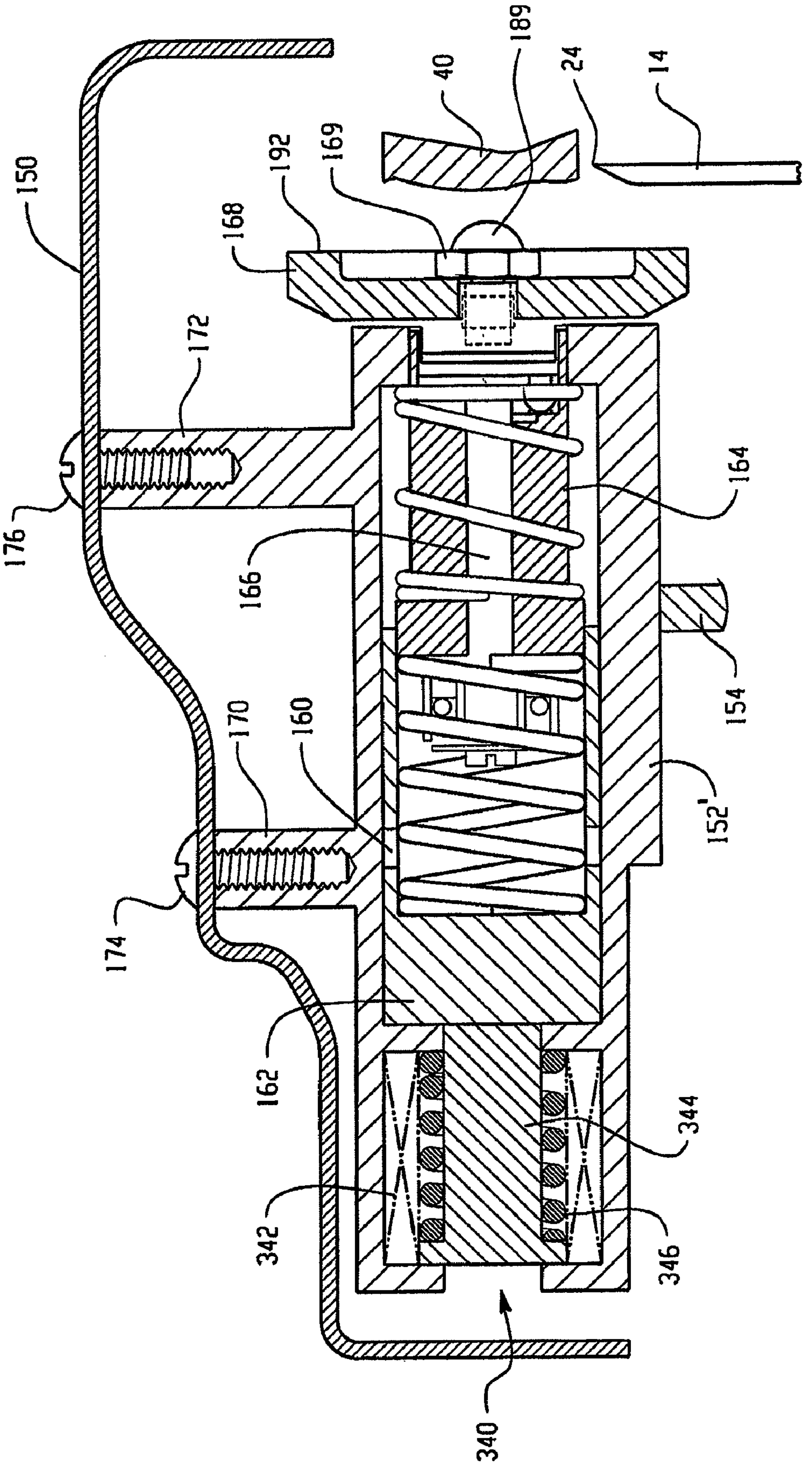
FIG. 3 is a partial cross-section of a powered knife sharpener assembly.

Referring to FIG. 3, an alternative embodiment of the sharpener assembly is shown in which a solenoid 340 is positioned at the end of an elongated block member 152'. The solenoid 340 includes a coil 342 that, when energized, moves plunger 344 to the right for moving the actuator body 162. A spring 346 biases the plunger 344 into the illustrated position. Thus, the FIG. 3 embodiment provides for automated sharpening (e.g., by pressing an input button that causes energization of the solenoid 340). The solenoid 340 may be energized for a set period of time such that sharpening takes place for a set period of time (e.g., such as in a range of 4 to 8 seconds, or whatever time period may be determined appropriate based upon testing). This feature assures adequate sharpening and a that same time avoids excessive sharpening that can wear the knife more quickly than desired. A similar feature could be implemented using other types of powered sharpeners. Moreover, a manually actuated sharpener could be modified to include a mechanically implemented timeout feature by which the sharpening time period could be controlled or set to be within a desired range.

Figure 4:
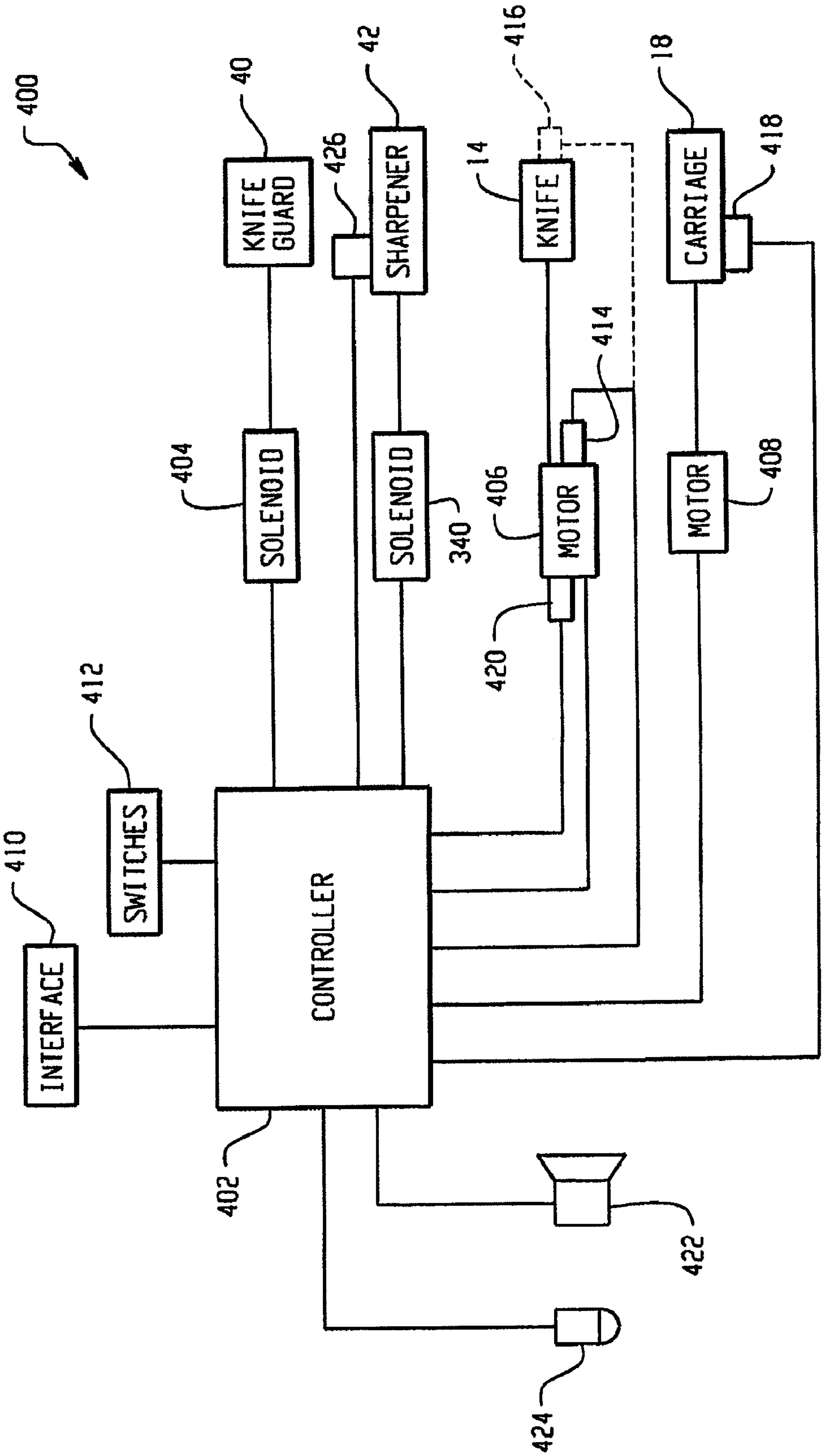
FIG. 4 is a block diagram of a slicer control arrangement.

Referring to FIG. 4, an exemplary slicer control system diagram 400 is shown. A controller 402 (which may include a processor and memory, such as flash memory) is connected with a solenoid 404 that may be provided for moving the knife guard member 40. Alternatively, solenoid 404 could be eliminated where the knife guard member 40 is manually movable as described above. Controller 402 is also connected with solenoid 340 associated with the sharpener assembly 42 (FIG. 3 embodiment). Where the sharpener assembly 42 is manual, solenoid 340 may be eliminated. Controller 402 is connected with a knife drive in the form of motor 406, and is also connected with a carriage drive in the form of motor 408. The carriage 18 may be selectively uncoupled from motor 408 to also permit manual movement of the carriage. Controller 402 is also connected with a user interface display 410 and with a user input in the form of one or more input keys or switches 412. If the display 410 is of the touch sensitive type, the display may function as a user input in addition to or in place of user input 412. A motor encoder 414 provides feedback to the controller 402, from which the controller can determine knife rotations if needed. Alternatively, an encoder or other sensor 416 may be associated with the knife 14 itself to track knife rotation. A sensor 418 provides feedback to the controller 402 regarding carriage position and/or movement. Sensor 418 may be as simple as an end of stroke switch or may take the form a more complex encoder arrangement. Different types of sensors, mechanical, optical or magnetic may also be sued. A motor load sensor 420 may also be provided for the knife motor 406. A control system such as that illustrated may be configured to automatically determine when to sharpen the slicer knife in any one of a variety of techniques, as will now be described.

In one technique, the controller 402 tracks a count of slicing strokes of the food product carriage 18, based upon the feedback from sensor 418, in order to determine when to sharpen the knife. Specifically, based upon knife testing it can be determined that, on average, a slicer knife needs to be sharpened after a given number of slicing strokes. The controller tracks the count of slicing strokes and when the count exceeds the given number, the controller outputs a knife sharpen signal (e.g., causing a buzzer or other audio annunciator 422 to output a sound, causing an LED or other visual annunciator 424 to output a visual signal and/or causing a sharpen message to be displayed on the display 410). In one implementation, the visual annunciator 424 may be incorporated into one of the user input buttons or switches that acts as knife sharpen trigger to the controller. Where the sharpener is manual, the slicer operator can then initiate a manual sharpening operation and actuate the user input 412 to reset the slicing stroke count once sharpening is completed. Alternatively, a sharpen sensor 426 could be mounted on the sharpener 42 to trigger a feedback to the controller 402 upon sharpening (e.g., after the sharpening wheel 168 has been fully extended for some minimum period of time).

Where the sharpener is automated (as by solenoid 340), the knife sharpen signal could cause sharpening to take place automatically, without requiring operator input. For example, the controller 402 could automatically initiate sharpening after the slicing stroke count reaches the given number, provided the slicer is not in use (e.g., after the slicer knife and carriage have been stopped for a set time period). Alternatively, the operator may be required to trigger automated sharpening via actuation of the user input 412, which could simultaneously serve to reset the count.

In one implementation of the slicing stroke counting technique, the slicing strokes are only counted when the knife is running (e.g., as determined by the motor 406 being energized or based upon the feedback from encoder 414 or sensor 416). In another implementation of the slicing stroke counting technique, the slicing strokes are only counted when the knife is running and when a load on the knife driver exceeds a threshold level (e.g., as determined by the feedback from load sensor 420). In yet another implementation of the slicing stroke counting technique, multiple slicing stroke counts can be tracked according to food product sliced. An algorithm may be used to evaluate the multiple counts in a cumulative manner, with the algorithm taking into account the impact the type of food product has on dulling of the knife (e.g., it takes less slicing strokes of cheese to dull the knife when compared to turkey slicing strokes). In the latter implementation, the user input 412 can be utilized by the operator to input the type of food product being sliced (as by entering a product look-up (PLU) number). Alternatively, the slicer may include RFID capabilities as described in the PCT application published under International Publication No. WO 2005/004071 A1, by which the slicer can automatically determine the product being sliced based upon a sensed RFID tag of the food product.

In another technique, the controller 402 may count rotations of the slicer knife 14 (as determined by feedback from encoder 414 and/or sensor 416, or as determined by assuming a certain running speed for the knife, tracking knife on time and calculating knife rotations) in order to determine when to sharpen the knife. Specifically, based upon knife testing it can be determined that, on average, a slicer knife needs to be sharpened after a given number of knife rotations takes place. The controller tracks the count of knife rotations and when the count exceeds the given number, the controller outputs the knife sharpen signal. In one implementation of the knife rotation counting technique, knife rotations are only counted when a load on the knife driver exceeds a threshold level (e.g., as determined by the feedback from load sensor 420). In another implementation of the knife rotation counting technique, knife rotations are only counted when the food product carriage is moving (as determined by the feedback from sensor 418 or by energization of motor 408; where sensor 418 is an end of stroke sensor switch, the carriage may be considered to be "moving" (as that term is used herein) provided the sensor 418 is repeatedly tripped within a set time period, such as being tripped every 3-6 seconds for example).

In yet another technique, the controller 402 may count the running time of the slicer knife (as determined by the knife motor 406 being energized or ad determined by feedback from encoder 414 and/or sensor 416) in order to determine when to sharpen the knife. Specifically, based upon knife testing it can be determined that, on average, a slicer knife needs to be sharpened after running for a certain period of time. The controller tracks a time count corresponding to knife running time and when the count exceeds the given number, the controller outputs the knife sharpen signal. In one implementation of the knife running time counting technique, the run time is only counted when the food product carriage is moving (as determined by feedback from sensor 418 or by energization of motor 408).

In determining whether the count for the selected knife use characteristic exceeds a set count, the count could be a count up from zero to the set count (in which case count reset is back to zero) or the count could be a count down from the set count to zero (in which case count reset is back to the set count).

In tracking the count of the selected knife use characteristic, in one embodiment the controller may actually maintain a digital count value in memory, with the value being incremented or decremented as the case may be. Other types of digital counter implementations could also be used. In another embodiment the controller may include an analogue counter, such as one in which voltage pulses (e.g., one pulse corresponding to one count) are input to an integrator. When the voltage output of the integrator reaches a specific voltage, the set count is considered to be reached Other types of analogue counters could also be used. Accordingly, as used herein, it is not necessary for a digital number to be stored and incremented/decremented in order for an apparatus to fall within the scope of the meaning of the term "track a count" or "tracking a count" as used in the claims.

In another embodiment, when the annunciator indicates that the knife needs to be sharpened, the operator could press a button that results in a knife sharpen signal. The slicer controller may responsively trigger operation of the slicer knife motor for a specific period of time (e.g., a time period known to provide suitable knife sharpening). In one implementation the slicer knife motor may be energized immediately in response to the knife sharpen signal and continuously energized for a suitable time period (e.g., 20 seconds, 15 seconds etc.). During the set time period the slicer operator manually moves the sharpener into sharpening position and waits for the knife motor to stop, at which point the operator moves the sharpener back the standby position and the sharpening operation is completed. The count is reset and the sharpen knife annunciator is de-energized. In another implementation the slicer knife motor may be maintained in an off/unenergized condition for a set time period after the knife sharpen signal (e.g., a timer period sufficient to enable the slicer operator to prepare to sharpen, such as 10 seconds, and then the slicer knife motor is energized for a set time period). During the pause between the knife sharpen signal and energization of the knife motor, the slicer operator manually places the knife sharpener into the sharpening position. Upon completion of the set time period the sharpener is moved back to the standby position and the sharpening operation is complete. The count is reset and the sharpen knife annunciator is de-energized.

In one example, the operator may be required to continue the button press during the full length of the knife sharpening operation in order to maintain energization of the slicer knife motor and assure that the count is reset. In this example, even though the button is pressed, slicer knife motor energization would be stopped after the set time period. If the button is not pressed for the full, set time period, the controller assumes that the sharpening operation was not completed and the count is not reset and the sharpen knife annunciator is maintained on.

On specific implementation technique is as follows: When the number of carriage cycles or slicing strokes reaches a set count for sharpening, a time-to-sharpen button on the slicer is illuminated to indicate to the operator that sharpening is needed. To sharpen, and with the knife off, the operator pushes and holds the time-to-sharpen button. There will be a delay (e.g., about 2 to 6 seconds, such as about 3 seconds) before the knife blade begins to rotate. The operator manually engages and holds the knife sharpening stone assembly into contact with the edge of the rotating knife and waits until the knife motor automatically stops (e.g. the time period for automated knife rotation could be set at about 10 to 20 seconds, such as about 15 seconds). Once knife rotation is ceased by the slicer controller, the operator releases the sharpening stone assembly, moving it out of contact with the knife edge and releases the time-to-sharpen button. The time-to-sharpen light will flash once or twice and then turn OFF, reflecting successful completion of the sharpening operation and the time-to-sharp count will also be reset.

It is to be clearly understood that the above description is intended by way of illustration and example only, is not intended to be taken by way of limitation, and that other changes and modifications are possible.

What is claimed is:

1. A slicer for use in slicing a food product, the slicer comprising:

a slicer body;

a slicer knife mounted for rotation relative to the slicer body, the slicer knife having a peripheral cutting edge, and an associated knife drive motor;

a food product carriage mounted to the slicer body for reciprocating movement back and forth past a cutting zone of the slicer knife;

a controller operable to activate a sharpen knife annunciator based upon at least one operating parameter of the slicer in order to alert an operator of need to sharpen the slicer knife, the controller associated with the knife drive motor to effect operation thereof;

an operator actuatable knife sharpen input device associated with the controller, upon operator actuation of the knife sharpen input device the controller causes the knife drive motor to be energized for a set knife sharpening time period.

2. The slicer of claim 1 wherein the knife drive motor is energized immediately in response to actuation of the knife sharpen input device.

3. The slicer of claim 1 wherein the knife drive motor is energized only after lapse of a certain time period following actuation of the knife sharpen input device.

4. The slicer of claim 1 wherein the knife sharpen input device must be maintained in an actuated condition for the knife motor to remain energized for the set knife sharpening time period.

5. The slicer of claim 4 wherein the sharpen knife annunciator is de-energized after the set time period, provided that the knife sharpen input device was maintained in the actuated condition for the entirety of the set knife sharpening time period.

6. A slicer for use in slicing a food product, the slicer comprising:

a slicer body;

a slicer knife mounted for rotation relative to the slicer body, the slicer knife having a peripheral cutting edge, and an associated knife drive motor;

a food product carriage mounted to the slicer body for reciprocating movement back and forth past a cutting zone of the slicer knife;

an operator actuatable knife sharpen input device;

a knife sharpen light element;

a sensor for detecting movement of the food product carriage;

a controller associated with the knife drive motor, the operator actuatable knife sharpen input device, the knife sharpen light element and the sensor, the controller programmed to (i) monitor the sensor to maintain a count of food product carriage slicing strokes, (ii) effect illumination of the knife sharpen light element when the count reaches a set threshold, (iii) upon operator actuation of the knife sharpen input device, effect operation of the knife drive motor for a set time period, after which operation of the knife drive motor is automatically stopped.

7. The slicer of claim 6 wherein the controller is programmed to reset the count upon completion of the set time period and cease illumination of the knife sharpen light element.

8. A slicer for use in slicing a food product, the slicer comprising:

a slicer body;

a slicer knife mounted for rotation relative to the slicer body, the slicer knife having a peripheral cutting edge, and an associated knife drive motor;

a food product carriage mounted to the slicer body for reciprocating movement back and forth past a cutting zone of the slicer knife;

a knife sharpen input device;

a knife sharpen light element;

a sensor for detecting movement of the food product carriage;

a controller associated with the knife drive motor, the knife sharpen input device, the knife sharpen light element and the sensor, the controller programmed to (i) monitor the sensor to maintain a count of food product carriage slicing strokes, (ii) effect illumination of the knife sharpen light element when the count reaches a set threshold, (iii) upon actuation of the knife sharpen input device, effect operation of the knife drive motor for a set time period, after which operation of the knife drive motor is automatically stopped;

wherein the controller is programmed to reset the count upon completion of the set time period and cease illumination of the knife sharpen light element;

wherein the controller is programmed such that, if actuation of the knife sharpen input device is stopped prior to completion of the set time period, operation of the knife drive motor is automatically stopped prior to completion of the set time period, illumination of the knife sharpen element is continued and the count is not reset.

9. The slicer of claim 8 wherein the controller is programmed such that, upon actuation of the knife sharpen input device, operation of the knife drive motor for the set time period is begun only after a set delay time period.

10. The slicer of claim 9 wherein the set time period is between about 10 and 20 seconds and the set delay time period is between about 2 and 6 seconds.

11. The slicer of claim 7 wherein the controller is programmed to flash the knife sharpen element at least once before ceasing illumination of the knife sharpen light element, so as to provide a visual indication that the sharpen operation is complete and the count has been reset.

12. A slicer for use in slicing a food product, the slicer comprising:

a slicer body;

a slicer knife mounted for rotation relative to the slicer body, the slicer knife having a peripheral cutting edge, and an associated knife drive motor;

a sharpener movable for engaging the slicer knife for sharpening;

a food product carriage mounted to the slicer body for reciprocating movement back and forth past a cutting zone of the slicer knife;

a controller associated with the knife drive motor to effect operation thereof;

an operator actuatable knife sharpen input device associated with the controller for initiating a sharpening operation;

wherein the controller is configured such that upon operator actuation of the knife sharpen input device the controller causes the knife drive motor to be energized for a set knife sharpening time period.

13. The slicer of claim 12 wherein the controller is configured such that the knife drive motor is energized immediately in response to actuation of the knife sharpen input device.

14. The slicer of claim 12 wherein the controller is configured such that the knife drive motor is energized only after lapse of a certain time period following actuation of the knife sharpen input device.

15. The slicer of claim 1, further comprising a manually actuated knife sharpener mounted on the slicer body.

16. The slicer of claim 1, further comprising a powered knife sharpener mounted on the slicer body.

17. The slicer of claim 6, further comprising a manually actuated knife sharpener mounted on the slicer body.

18. The slicer of claim 6, further comprising a powered knife sharpener mounted on the slicer body.

* * * * *